US009168502B2

(12) United States Patent
Miyake et al.

(10) Patent No.: US 9,168,502 B2
(45) Date of Patent: Oct. 27, 2015

(54) APPARATUS FOR PRODUCING TRICHLOROSILANE

(71) Applicant: MITSUBISHI MATERIALS CORPORATION, Tokyo (JP)

(72) Inventors: Masami Miyake, Naka-gun (JP); Naoya Murakami, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 350 days.

(21) Appl. No.: 13/686,007

(22) Filed: Nov. 27, 2012

(65) Prior Publication Data

US 2013/0136667 A1    May 30, 2013

(30) Foreign Application Priority Data

Nov. 28, 2011    (JP) .................................. 2011-259483

(51) Int. Cl.
| | | |
|---|---|---|
| B01J 12/00 | (2006.01) | |
| C01B 33/107 | (2006.01) | |
| B01J 19/24 | (2006.01) | |

(52) U.S. Cl.
CPC ................ B01J 12/00 (2013.01); B01J 12/005 (2013.01); B01J 19/244 (2013.01); C01B 33/1071 (2013.01); B01J 2219/00135 (2013.01); B01J 2219/00155 (2013.01); B01J 2219/185 (2013.01); B01J 2219/1943 (2013.01)

(58) Field of Classification Search
CPC .......................... C01B 33/107; C01B 33/1071
USPC .......................................... 423/342; 422/199
See application file for complete search history.

(56) References Cited

U.S. PATENT DOCUMENTS

| | | | |
|---|---|---|---|
| 5,906,799 A | 5/1999 | Burgie et al. | |
| 2009/0155138 A1* | 6/2009 | Ishii et al. | ...................... 422/187 |
| 2009/0155140 A1* | 6/2009 | Ishii et al. | ...................... 422/198 |
| 2009/0269259 A1* | 10/2009 | Ishii et al. | ...................... 422/198 |

FOREIGN PATENT DOCUMENTS

JP    3781439 B2    10/1994

* cited by examiner

Primary Examiner — Jennifer A Leung
(74) Attorney, Agent, or Firm — Locke Lord LLP

(57) ABSTRACT

An apparatus for producing trichlorosilane in which reacted gas including trichlorosilane and hydrogen chloride is produced by heating raw gas including silicon tetrachloride and hydrogen, the apparatus having: a reaction vessel having a substantially cylindrical shape and being provided with a heated wall forming a gas flow-passage along an axis direction; and a heater heating the heated wall, wherein a folding flow-passage is provided at an uppermost stream of the gas flow-passage and has: an inlet flow-passage in which raw gas is introduced; and a turning part connected to a downstream of the inlet flow-passage in which a flow direction of the raw gas is turned at least once in an opposite direction, the turning part is formed between the inlet flow-passage and the heated wall in the folding flow-passage, and a turning length of the folding flow-passage along the axis direction is smaller than a maximum length of the gas flow-passage along the axis direction.

10 Claims, 5 Drawing Sheets

APPARATUS FOR PRODUCING TRICHLOROSILANE

BACKGROUND OF THE INVENTION

1. Field of the Invention

The present invention relates to an apparatus for producing trichlorosilane. Priority is claimed on Japanese Patent Application No. 2011-259483, filed Nov. 28, 2011, the content of which is incorporated herein by reference.

2. Description of Related Art

Trichlorosilane ($SiHCl_3$) used as raw material for producing high-purity silicon (Si) can be produced from silicon tetrachloride ($SiCl_4$) and hydrogen.

Silicon is produced by reductive reaction and thermal decomposition reaction of trichlorosilane according to below reaction formulas (1) and (2). Trichlorosilane used for these reactions is produced by reaction according to below reaction formula (3).

$$SiHCl_3 + H_2 \rightarrow Si + 3HCl \quad (1)$$

$$4SiHCl_3 \rightarrow Si + 3SiCl_4 + 2H_2 \quad (2)$$

$$SiCl_4 + H_2 \rightarrow SiHCl_3 + HCl \quad (3)$$

Reaction of the formula (3) is caused by introducing raw gas including silicon tetrachloride and hydrogen into a high-temperature reaction vessel. For example, in Japanese Patent No. 3,781,439, an apparatus for producing trichlorosilane having a structure in which heating elements surround a double-pipe reaction chamber having an outer chamber and an inner chamber formed by two concentric pipes is proposed.

That is to say, in the apparatus for producing trichlorosilane mentioned in Japanese Patent No. 3,781,439, the raw gas preheated in a heat exchanger provided under the reaction chamber is introduced from below to, the outer chamber of the reaction chamber, flows upward in the outer chamber while being heated, turns at an upper part of the outer chamber so as to be introduced into the inner chamber, flows downward in the inner chamber, and then is discharged from a lower part of the inner chamber.

SUMMARY OF THE INVENTION

Problems to be Solved by the Invention

In the conventional apparatus for producing trichlorosilane proposed in Japanese Patent No. 3,781,439, low-temperature raw gas is heated by being in contact with a wall surface of the high-temperature outer chamber heated by the heating elements. Therefore, the difference of temperature is large between an inner surface and an outer surface of the wall of the outer chamber, particularly in a vicinity of an inlet for the raw gas, so that breakages or cracks may be generated at this part.

Means for Solving the Problem

The present invention is achieved in consideration of the above circumstances, and has an object of preventing a reaction vessel from breakages by difference of temperature generated by raw gas and heaters in an apparatus for producing trichlorosilane.

The present invention is an apparatus for producing trichlorosilane in which reacted gas including trichlorosilane and hydrogen chloride is produced by heating raw gas including silicon tetrachloride and hydrogen, the apparatus including: a reaction vessel having a substantially cylindrical shape and being provided with a heated wall forming a gas flow-passage along an axis direction so as to heat the raw gas; and a heater heating the heated wall. In this apparatus, a folding flow-passage is provided at an uppermost stream of the gas flow-passage. The folding flow-passage is formed so that a flow direction of the raw gas is turned in the reaction vessel at least once in an opposite direction within a turning length along the axis direction that is smaller than a maximum length of the gas flow-passage along the axis direction.

In an apparatus for producing trichlorosilane, when low-temperature raw gas before heated is in contact with a high-temperature heated wall, the heated wall may be broken because of difference of temperature between a high-temperature heated surface and an opposite surface which is cooled down by the low-temperature raw gas before heated. On the other hand, according to the apparatus for producing trichlorosilane of the present invention, since the folding flow-passage is provided at the uppermost stream of the gas flow-passage, the raw gas can be introduced into the gas flow-passage after the low-temperature gas is heated in the folding flow-passage. Therefore, the difference of temperature at the heated wall can be decreased, so that the reaction vessel can be prevented from being broken.

In the apparatus for producing trichlorosilane according to the present invention, it is preferable that the turning length of the folding flow-passage along the axis direction be not less than 10% and not more than 50% of the maximum length of the gas flow-passage along the axis direction. In a case in which the turning length of the folding flow-passage is shorter than 10% of the maximum length along the axis direction, the raw gas introduced in the gas flow-passage cannot be heated enough, so that an effect of decreasing the temperature difference between the inside and the outside of the heated wall of the reaction vessel cannot be obtained enough. On the other hand, in a case in which the turning length of the folding flow-passage is longer than 50% of the maximum length along the axis direction, components forming the folding flow-passage are large, so that the reaction vessel may not be stabilized or may be complicated. Furthermore, if the folding flow-passage is large, heating efficiency may be decreased. Therefore, it is preferable to set the turning length along the axis direction in a range of not less than 10% and not more than 50% of the maximum length along the axis direction of the gas flow-passage for preventing the breakage of the components of the heated wall of the reaction vessel.

Effects of the Invention

According to the apparatus for producing trichlorosilane of the present invention, a reaction vessel can be prevented from being broken by difference of temperature between raw gas and a heater.

DESCRIPTION OF THE PREFERRED EMBODIMENTS

Figure 1:
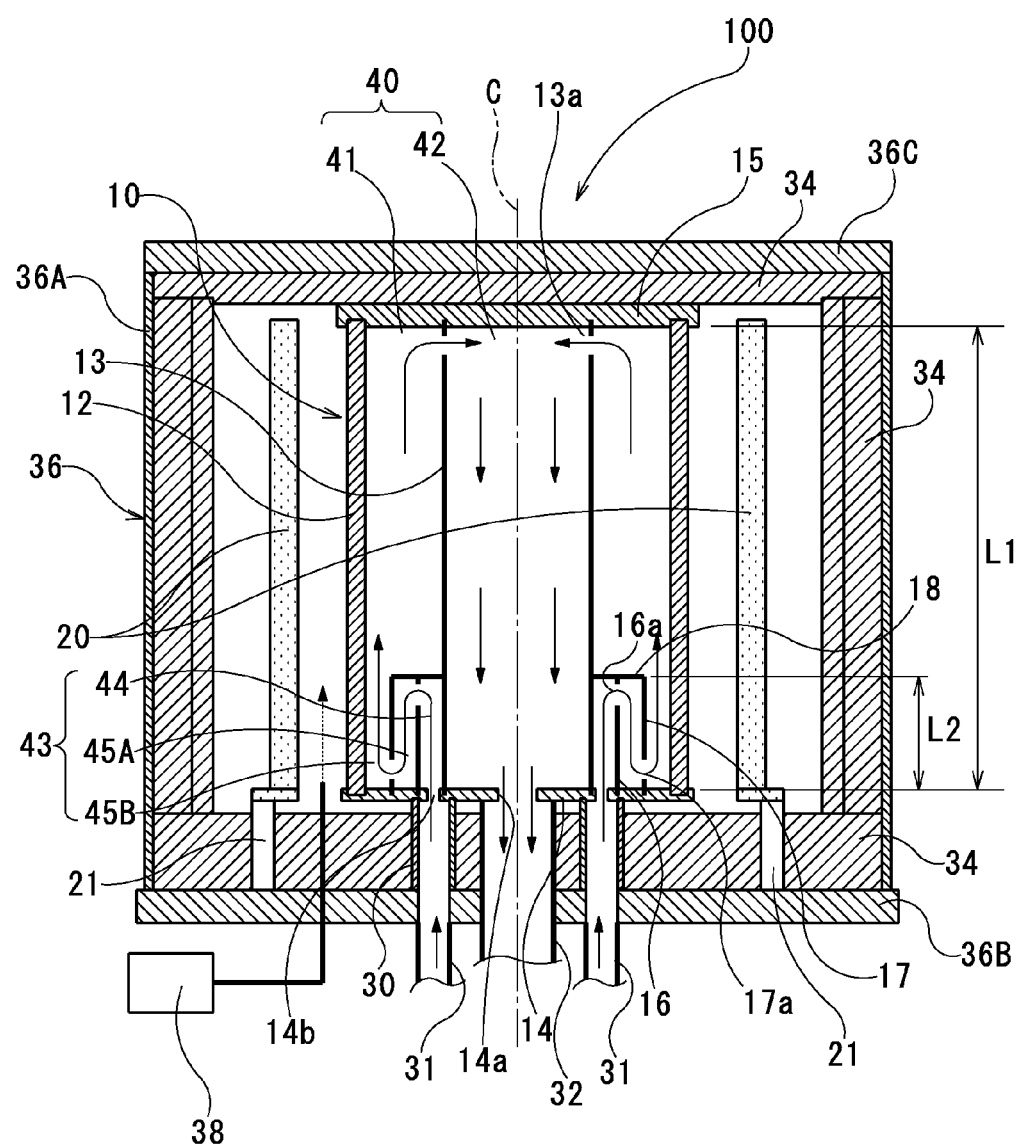
FIG. 1 is a cross sectional view showing a first embodiment of an apparatus for producing trichlorosilane according to the present invention.

Hereinafter, embodiments of the apparatus for producing trichlorosilane according to the present invention will be described with reference to the drawings. As shown in FIG. 1, an apparatus for producing trichlorosilane of a first embodiment (hereinafter, "the producing apparatus 100) has: a reaction vessel 10 in which raw gas including silicon tetrachloride and hydrogen is supplied so that reacted gas including trichlorosilane and hydrogen chloride is generated; heaters 20 which are arranged around the reaction vessel 10 and heat the reaction vessel 10 from outside; gas-supply pipes 30 which supply the raw gas into the reaction vessel 10; a gas-discharge pipe 32 which discharges the reacted gas from the reaction vessel 10; a thermal insulator 34 which covers the reaction vessel 10 and the heaters 20; a container 36 which stores the reaction vessel 10, the heaters 20 and the thermal insulator 34; and an argon supply device 38 which supplies argon (Ar) into the container 36.

The members constructing the reaction vessel 10 are made of carbon and coated with silicon carbide at the surfaces thereof. The container 36 is constructed by a cylindrical wall 36A, a bottom plate portion 36B and a top plate portion 36C closing the both end of the cylindrical wall 36A, and is made of stainless steel.

The heaters 20 are heating elements made of carbon arranged around the reaction vessel 10. Electrodes 21 for supplying the current to the heaters 20 are in connected with lower parts of the heaters 20. The heaters 20 heat an outer wall (a heated wall) 12 of the reaction vessel in a state in which the heaters 20 are stored in the container 36 with the reaction vessel 10. The heaters 20 are controlled in order to maintain temperature inside the reaction vessel 10 (i.e., a gas flow-passage 40) within a range of 500° C. to 1000° C.

The inside of the container 36 is filled with argon gas supplied from the argon supply device 38 and maintained higher-pressure than inner pressure of the reaction vessel 10 in order to prevent the container 36 from being corroded when the raw gas leaks from the reaction vessel 10 into the container 36. The inner surface of the container 36 made of stainless steel is covered with the thermal insulator 34 made of carbon.

The reaction vessel 10 has: the outer wall (i.e., the heated wall) 12 and an inner wall 13 which are cylindrically provided so as to faun the gas flow-passage 40 extending along a direction of an axis C direction; a bottom plate 14 having a substantially circular-plate shape and closing an opening between the outer wall 12 and the inner wall 13 at the lower parts; and a top plate 15 having a substantially circular-plate shape and closing an opening between the outer wall 12 and the inner wall 13 at the upper parts.

The outer wall 12 and the inner wall 13 are formed from substantially cylindrical. members having different diameters, and form a cylindrical space (i.e., a first flow-passage 41) between themselves by being arranged concentrically. At the upper part of the inner wall 13, a plurality of passage holes 13a connecting the inside of the inner wall 13 (i.e., a second flow-passage 42) and the outer first flow-passage 41 are formed.

That is to say, in the reaction vessel 10, between the bottom plate 14 and the top plate 15, the gas flow-passage 40 is formed by connecting the cylindrical first flow-passage 41 formed between the outer wall 12 and the inner wall 13 and the columnar second flow-passage 42 formed inside the inner wall 13 through the passage holes 13a.

A gas-discharge pipe 32 is connected to the second flow-passage 42 at the downstream of the gas flow-passage 40 through a gas-discharge hole 14a formed at a center of the bottom plate 14. The gas-supply pipe 30 is connected to the first flow-passage 41 at the upstream of the gas flow-passage 40 through a gas-supply hole 14b formed at the bottom plate 14 between the inner wall 13 and the outer wall 12.

The gas-supply pipe 30 has a double-pipe structure of the axis C as a center, and has a cylindrical space connecting with the gas-supply hole 14b. Moreover, the gas-supply pipe 30 is connected with a plurality of pipes 31 which are arranged along a circle around the axis C with substantially equal intervals through the bottom plate portion 36B.

At an uppermost stream of the gas flow-passage 40, that is to say, at the lower part between the outer wall 12 and the inner wall 13, a folding flow-passage 43 is provided so as to have: an inlet flow-passage 44 in which the raw gas is introduced and flows along the axis C direction; and a turning part (i.e., a first turning part 45A and a second turning part 45B) connected with the downstream of the inlet flow-passage 44 so as to turn a flow direction of the raw gas at least once in an opposite direction. In the folding flow-passage 43, the turning part (the first turning part 45A and the second turning part 45B) are formed between the inlet flow-passage 44 and the heated wall (i.e., the outer wall) 12.

Specifically, the folding flow-passage 43 is constructed at uppermost stream of the gas flow-passage 40 of: the outer wall 12, the inner wall 13; a first cylindrical member 16 arranged concentrically with the inner wall 13; a second cylindrical member 17 provided concentrically with and further outer peripheral of the first cylindrical member 16; and an annular top plate 18 closing the upper part of the first cylindrical member 16 and the second cylindrical member 17. The outer wall 12, the inner wall 13, the first cylindrical member 16, the second cylindrical member 17 and the annular top plate 18 which form the folding flow-passage 43 are made of carbon and coated by silicon carbide in order to prevent a generation of impurities or the like under high temperature.

Figure 2:
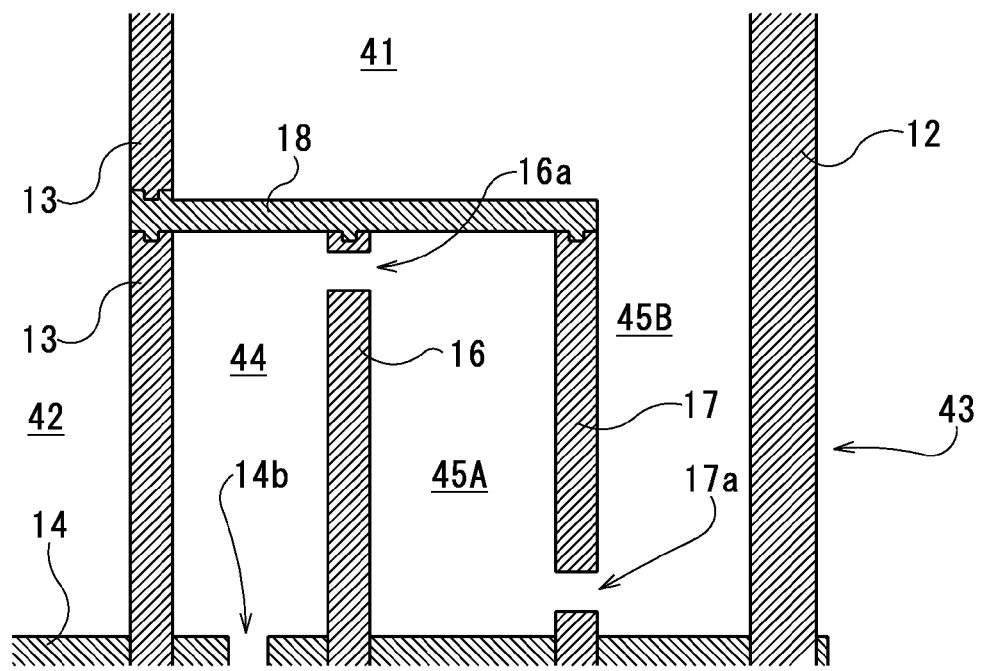
FIG. 2 is an enlarged cross-sectional view showing a folding flow-passage in the apparatus for producing trichlorosilane shown in FIG. 1.

FIG. 2 is an enlarged cross-sectional view showing the folding flow-passage 43. In this case, the outer wall 12, the inner wall 13, the first cylindrical member 16 and the second cylindrical member 17 are cylindrical; and the annular top plate 18 is plate-like. These members are joined with each other by engaging depressed portions and protruded portions. Therefore, the folding flow-passage 43 is easy to be formed and has no complex part, thin part and the like.

The inlet flow-passage 44 formed between the inner wall 13 and the first cylindrical member 16 is connected to the first turning part 45A formed between the first cylindrical member 16 and the second cylindrical member 17 through a plurality of passage holes 16a formed penetrating radially the upper part of the first cylindrical member 16.

The first turning part 45A is connected to the second turning part 45B formed between the second cylindrical member 17 and the outer wall 12 through a plurality of passage holes 17a formed penetrating radially the lower part of the second cylindrical member 17.

That is to say, the folding flow-passage 43 is formed at an uppermost stream of the gas flow-passage 40 by linking the inlet flow-passage 44, the first turning part 45A and the second turning part 45B with each other through the passage holes 16a and 17a.

The first cylindrical member 16, the second cylindrical member 17 and the annular top plate 18 forming the folding flow-passage 43 are formed thinner than the outer wall 12 supporting the top plate 15 of the reaction vessel 10 and the bottom plate 14 in order to prevent the breakage or cracks by the difference of temperature between the inside and the outside. As a result, the difference of temperature between the inside and the outside of the members forming the folding flow-passage 43 is suppressed, so that the breakage and the cracks by the difference of temperature can be prevented. Furthermore, the inlet flow-passage 44, the first turning part 45A and the second turning part 45B are linked in the folding flow-passage 43 and are turned at a turning length L2 along the axis C direction that is smaller than the maximum length L1 along the axis C direction of the gas flow-passage 40. The turning length L2 along the axis C direction of the folding flow-passage 43 is set in a range of not less than 10% and not more than 50% of the maximum length L1 along the axis C direction of the gas flow-passage 40.

In the reaction vessel 10, the raw gas is supplied to the inlet flow-passage 44 of the folding flow-passage 43 from the pipes 31 through the gas-supply pipes 30, flows through the first turning part 45A and the second turning part 45B, and is introduced into the first flow-passage 41. The raw gas is heated by the outer wall 12, inner wall 13 and the second cylindrical member 17 while flowing through the second turning part 45B and the first flow-passage 41. Then, the raw gas is introduced into the second flow-passage 42 through the passage holes 13a of the inner wall 13. Finally, the raw gas is discharged as reacted gas from the reaction vessel 10 to the gas-discharge pipe 32 through the gas-discharge hole 14a.

The raw gas introduced in the gas flow-passage 40, for example, at 600° C., is heated gradually in the folding flow-passage 43 reversing at the turning length L2 along the axis C direction. Accordingly, the temperature of the raw gas is increased to about 700° C., for example, at the second turning part 45B in which the raw gas is in contact with the outer wall 12. Therefore, the difference of temperature between the inside and the outside of the outer wall 12 which is directly heated is suppressed, so that the outer wall 12 is prevented from being broken by difference of thermal expansion and the like.

In this case, if the turning length L2 along the axis C direction is shorter than 10% of the maximum length L1 along the axis C direction, the raw gas introduced in the gas flow-passage 40 cannot be heated sufficiently, so that the difference of the temperature between the inside and the outside of the outer wall (the heated wall) 12 of the reaction vessel 10 cannot be reduced sufficiently.

On the other hand, if the turning length L2 along the axis C direction is longer than 50% of the maximum length L1 along the axis C direction, the members constructing the folding flow-passage 43 (i.e., the first cylindrical member 16 and the second cylindrical member 17) have large heights, so that the folding flow-passage 43 may be unstable. Furthermore, since the first cylindrical member 16 and the second cylindrical member 17 are made of carbon, it is impossible to form into large size. If the folding flow-passage 43 is formed by connecting a plurality of parts, the construction may be complex.

Furthermore, in the producing apparatus 100 for trichlorosilane, the inner wall 13 also reaches a high temperature by receiving radiation heat of the outer wall 12 which is directly heated by the heaters 20. However, in a case in which the turning length L2 along the axis C direction is longer than 50% of the maximum length L1 along the axis C direction, since the area of the inner wall 13 receiving the radiation heat from the outer wall 12 is reduced, the temperature of the inner wall 13 is reduced, so that the heating efficiency at the second flow-passage 42 may be decreased. Therefore, it is preferable to set the turning length L2 along the axis C direction of the folding flow-passage 43 to a range of not less than 10% and not more than 50% of the maximum length L1 along the axis C direction of the gas flow-passage 40.

As explained above, according to the producing apparatus 100 for trichlorosilane of the present embodiment, since the folding flow-passage 43 is provided at the uppermost stream of the gas flow-passage 40 reversing from the outer peripheral side to the center in the reaction vessel 10 so as to turn two or more times at the turning length L2 along the axis C direction shorter than the maximum length L1 along the axis C direction of the gas flow-passage 40, the difference of temperature between the inside and the outside of the outer wall 12 which is heated by the heaters 20 can be reduced, so that the breakage by the difference of temperature between the inside and the outside at these parts can be prevented. Also, since the first cylindrical member 16 and the second cylindrical member 17 are formed thin, the breakage by the difference of temperature at these parts can be prevented. Furthermore, since the first cylindrical member 16 and the second cylindrical member 17 are provided between the inner wall 13 and the outer wall 12, the temperature at the lower part of the inner wall 13 is prevented from increasing, so that the breakage by the difference of temperature between the inside and the outside of the inner wall 13 can be prevented.

Next, a second embodiment of the producing apparatus 300 for trichlorosilane according to the present invention will be described with reference to FIG. 3. In comparison with the producing apparatus 100 for trichlorosilane of the first embodiment in which the heaters 20 are arranged at an outer periphery of the reaction vessel 10, an apparatus for producing trichlorosilane (a producing apparatus) 300 has a structure in which heaters 320 are arranged at a center of the apparatus and a reaction vessel 310 forming a gas flow-passage 340 covers the heaters 320.

In the producing apparatus 300 for trichlorosilane, the same parts of the producing apparatus 100 for trichlorosilane in the first embodiment, for example, the argon supply device 38, the container 36 and the like, are denoted by the same reference symbols and the explanations thereof are omitted.

In the producing apparatus 300 for trichlorosilane, the reaction vessel 310 has: an outer wall 312 and an inner wall 313 each having substantially cylindrical shapes and forming the gas flow-passage 340 extending along the axis C direction; a heater-storing wall (a heated wall) 319 having a substantially cylindrical shape and forming a storing space for the heaters 320; a bottom plate 314 closing the lower openings of the outer wall 312, the inner wall 313 and the heater-storing wall 319; and a top plate 315 closing the upper openings of the outer wall 312, the inner wall 313 and the heater-storing wall 319.

The heater-storing wall 319 forms a space separated from the gas flow-passage 340 at the center of the reaction vessel 310. The heaters 320 are stored inside the heater-storing wall 319 and heat the heater-storing wall 319.

The heater-storing wall 319 is formed from a substantially cylindrical member having a different diameter from that of the inner wall 313, and forms a cylindrical space (a first flow-passage 341) by being arranged with the inner wall 313 concentrically. The outer wall 312 and the inner wall 313 are formed from substantially cylindrical members having the other diameter from each other, and form a cylindrical space (a second flow-passage 342) between themselves by being arranged concentrically. At the upper part of the inner wall 313, a plurality of passage holes 313a are formed so as to connect the inner first flow-passage 341 and the outer second flow-passage 342 with intervening the inner wall 313.

That is to say, in the reaction vessel 310, between the bottom plate 314 and the top plate 315, the cylindrical first flow-passage 341 is formed between the inner wall 313 and the heater-storing wall 319 and the cylindrical second flow-passage 342 is formed between the outer wall 312 and the inner wall 313, so that the gas flow-passage 340 is formed by connecting the first flow-passage 341 and the second flow-passage 342 through the passage holes 313a.

The first flow-passage 341 provided at the upper stream of the gas flow-passage 340 is connected to a gas-supply pipe 330 through a gas-supply hole 314b formed between the inner wall 313 and the heater-storing wall 319 at the bottom plate 314. The gas-supply pipe 330 has a double-pipe structure of the axis C as a center, and has a cylindrical space connecting with the gas-supply hole 314b. Moreover, the gas-supply pipe 330 is connected with a plurality of pipes 331 which are arranged along a circle around the axis C with substantially equal intervals.

The second flow-passage 342 provided at the downstream of the gas flow-passage 340 is connected with the gas-discharge pipe 332 through a gas-discharge hole 314a formed at the bottom plate 314 between the inner wall 313 and the outer wall 312. The gas-discharge pipe 332 has a double-pipe structure of the axis C as a center, and has a cylindrical space connecting with the gas-discharge hole 314a. Moreover, the gas-discharge pipe 332 is connected with a plurality of pipes 333 which are arrange along a circle around the axis C with substantially equal intervals.

At an uppermost stream of the gas flow-passage 340, that is to say, at the lower part between the heater-storing wall 319 and the inner wall 313, a folding flow-passage 343 is provided so as to have: an inlet flow-passage 344 in which the raw gas is introduced and flows along the axis C direction; and a turning part (i.e., a first turning part 345A and a second turning part 345B) connected with the downstream of the inlet flow-passage 344 so as to turn a flow direction of the raw gas at least once in an opposite direction. In the folding flow-passage 343, the turning part (the first turning part 345A and the second turning part 345B) are formed between the inlet flow-passage 344 and the first flow-passage 341.

Specifically, the folding flow-passage 343 is formed from: the inner wall 313; a first cylindrical member 316 arranged concentrically with the inner wall 313; a second cylindrical member 317 provided concentrically with and further inner circumference of the first cylindrical member 316; an annular top plate 318 closing the upper openings of the first cylindrical member 316 and the second cylindrical member 317; and the heater-storing wall 319.

The inlet flow-passage 344 formed between the inner wall 313 and the first cylindrical member 316 and the first turning part 345A formed between the first cylindrical member 316 and the second cylindrical member 317 are connected with each other through a plurality of passage holes 316a penetrating radially the upper part of the first cylindrical member 316.

The first turning part 345A and the second turning part 345B formed between the second cylindrical member 317 and the heater-storing wall 319 are connected with each other through a plurality of passage holes 317a penetrating radially the lower part of the second cylindrical member 317.

That is to say, the folding flow-passage 343 is formed at an uppermost stream of the gas flow-passage 340 by linking the inlet flow-passage 344, the first turning part 345A and the second turning part 45B with each other through the passage holes 316a and 317a.

The first cylindrical member 316, the second cylindrical member 317 and the annular top plate 318 forming the folding flow-passage 343 are formed thinner than the outer wall 312 supporting the top plate 315 of the reaction vessel 310 and the bottom plate 314 in order to prevent the breakage or cracks by the difference of temperature between a surface and the opposite surface. As a result, the difference of temperature between a surface and the opposite surface of the members forming the folding flow-passage 343 is suppressed, so that the breakage and the cracks by the difference of temperature can be prevented. Furthermore, the inlet flow-passage 344, the first turning part 345A and the second turning part 345B are linked in the folding flow-passage 343 and are formed by a turning length L2 along the axis C direction that is smaller than the maximum length L1 along the axis C direction of the gas flow-passage 340. Accordingly, in the producing apparatus 300 for trichlorosilane of the present embodiment, the turning length L2 along the axis C direction of the folding flow-passage 343 is set in a range of not less than 10% and not more than 50% of the maximum length L1 along the axis C direction along the axis C direction of the gas flow-passage 340.

In the reaction vessel 310, the raw gas is supplied to the inlet flow-passage 344 of the folding flow-passage 343 from the pipes 331 through the gas-supply pipes 330, flows through the first turning part 345A and the second turning part 345B, and is introduced into the first flow-passage 341, further into the second flow-passage 342 through the passage holes 313a. The raw gas is heated by the heater-storing wall 319 which is heated by the heaters 320 and the inner wall 313 which is heated by the radiation heat of the heater-storing wall 319 while flowing through the first flow-passage 341. Then, the raw gas flows in the second flow-passage 342. Finally, the raw gas is discharged as reacted gas from the reaction vessel 310 to the gas-discharge pipe 332 through the gas-discharge hole 314a.

The raw gas introduced in the gas flow-passage 340, for example, at 600° C., is heated gradually in the folding flow-passage 343 reversing at the turning length L2 along the axis C direction. Furthermore, the raw gas is introduced into the second flow-passage 342 through the first flow-passage 341 from the folding flow-passage 343 with being further heated. Therefore, the temperature of the raw gas is highest (for example, about 830° C.) at the vicinity of the gas-discharge hole 314a of the second flow-passage 342. In the producing apparatus 300 for trichlorosilane, the raw gas with the lowest temperature is heated at the vicinity of the gas-supply hole 314b, so as to reach, for example, about 680° C. at the second turning part 345B in which the raw gas is in contact with the heater-storing wall 319. Therefore, the difference of the temperature between the inside and the outside of the heater-storing wall 319 is suppressed, so that the heater-storing wall 319 is prevented from being broken by the difference of thermal expansion and the like.

As explained above, according to the producing apparatus for trichlorosilane of the present invention, since the folding flow-passage is provided in the gas flow-passage of the raw gas, the low-temperature raw gas can be heated to a certain extent before being contact with the high-temperature heated wall. Therefore, the heated wall can be prevented from being broken by the difference of the temperature.

In the producing apparatuses of the above embodiments, the raw gas is introduced into the reaction vessel from the lower part thereof and discharged from the lower part thereof.

However, a structure in which the raw gas is introduced from the lower part and discharged from the upper part, or a structure in which the raw gas is introduced from the upper part and discharged from the upper part may be acceptable. Moreover, although the number of turnover in the folding flow-passage is set as twice in the above embodiments, it is not limited to twice and may be set appropriately.

Figure 4:
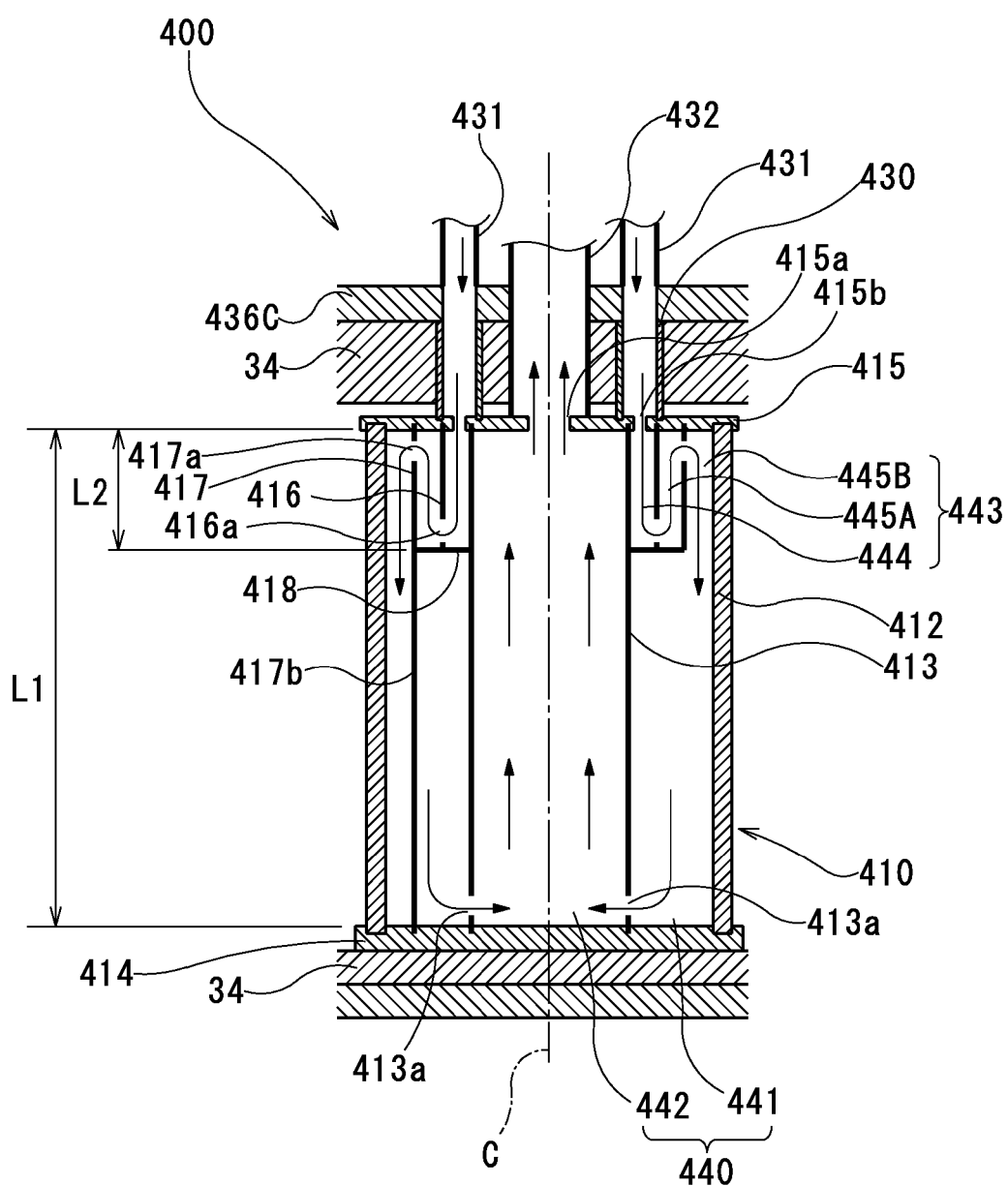
FIG. 4 is a cross sectional view showing a third embodiment of an apparatus for producing trichlorosilane according to the present invention.

For example, a third embodiment and forth embodiment in which the raw gas is supplied from the upper part of the reaction vessel and discharged from the upper part will be described. In a producing apparatus 400 for trichlorosilane according to the third embodiment shown in FIG. 4, the heaters (not illustrated) are arranged outside a reaction vessel 410 as the producing apparatus 100 for trichlorosilane of the first embodiment. In the producing apparatus 400 for trichlorosilane, the same parts of the producing apparatus 100 for trichlorosilane in the first embodiment, for example, the heaters 20, the argon supply device 38, the storing case 36 and the like, are denoted by the same reference symbols and the explanations thereof are omitted.

In the producing apparatus 400 for trichlorosilane, a reaction vessel 410 has: an outer wall (a heated wall) 412 and an inner wall 413 which have cylindrical shapes and form a gas flow-passage 440 extending along the axis C direction and having a maximum length L1 along the axis C direction; a bottom plate 414 closing the lower openings of the outer wall 412 and the inner wall 413; and a top plate 415 closing the upper openings of the outer wall 412 and the inner wall 413.

The outer wall 412 and the inner wall 413 are formed from substantially cylindrical members having different diameters, and form a cylindrical space (i.e., a first flow-passage 441) between themselves by being arranged concentrically. At the lower part of the inner wall 413, a plurality of passage holes 413a connecting the inside of the inner wall 413 (i.e., a second flow-passage 442) and the outer first flow-passage 441 are formed.

That is to say, in the reaction vessel 410, between the bottom plate 414 and the top plate 415, the gas flow-passage 440 is formed by connecting the cylindrical first flow-passage 441 formed between the outer wall 412 and the inner wall 413 and the columnar second flow-passage 442 formed inside the inner wall 413 through the passage holes 413a.

A gas-discharge pipe 432 is connected to the second flow-passage 442 at the downstream of the gas flow-passage 440 through a gas-discharge hole 415a formed at a center of the top plate 415. The gas-supply pipe 430 is connected to the first flow-passage 441 at the upstream of the gas flow-passage 440 through a gas-supply hole 415b formed at the top plate 415 between the inner wall 413 and the outer wall 412.

The gas-supply pipe 430 has a double-pipe structure of the axis C as a center, and has a cylindrical space connecting with the gas-supply hole 415b. Moreover, the gas-supply pipe 430 is connected with a plurality of pipes 431 which are arranged along a circle around the axis C with substantially equal intervals through the top plate portion 436C.

At an uppermost stream of the gas flow-passage 440, that is to say, at the upper part between the outer wall 412 and the inner wall 413, a folding flow-passage 443 is provided so as to have: an inlet flow-passage 444 in which the raw gas is introduced and flows along the axis C direction; and a turning part (i.e., a first turning part 445A and a second turning part 445B) connected with the downstream of the inlet flow-passage 444 so as to turn a flow direction of the raw gas at least once in an opposite direction. In the folding flow-passage 443, the turning part (the first turning part 445A and the second turning part 445B) are formed between the inlet flow-passage 444 and the heated wall (i.e., the outer wall) 412.

Specifically, the folding flow-passage 443 having a turning length L2 along the axis C direction is formed at uppermost stream of the gas flow-passage 440 from: the outer wall 412, the inner wall 413; a first cylindrical member 416 arranged concentrically with the inner wall 413; a second cylindrical member 417 provided concentrically with and further outer peripheral of the first cylindrical member 416; and an annular bottom plate 418 closing the bottom openings of the first cylindrical member 416 and the second cylindrical member 417. The outer wall 412, the inner wall 413, the first cylindrical member 416, the second cylindrical member 417 and the annular bottom plate 418 which form the folding flow-passage 443 are formed from carbon and coated by silicon carbide in order to prevent a generation of impurities or the like under high temperature.

The structure of the folding flow-passage 443 is substantially the same as the structure upside-down the structure in the first embodiment shown in FIG. 1. Furthermore in this embodiment, a plurality of supports 417b supporting the second cylindrical member 417 and the annular bottom plate 418 are arranged circumferentially with substantially equal intervals under the second cylindrical member 417.

The inlet flow-passage 444 formed between the inner wall 413 and the first cylindrical member 416 is connected to the first turning part 445A formed between the first cylindrical member 416 and the second cylindrical member 417 through a plurality of passage holes 416a formed penetrating radially the lower part of the first cylindrical member 416.

The first turning part 445A is connected to the second turning part 445B formed between the second cylindrical member 417 and the outer wall 412 through a plurality of passage holes 417a formed penetrating radially the upper part of the second cylindrical member 417.

That is to say, the folding flow-passage 443 is formed at an uppermost stream of the gas flow-passage 440 by linking the inlet flow-passage 444, the first turning part 445A and the second turning part 445B with each other through the passage holes 416a and 417a.

As explained above, according to the producing apparatus 400 for trichlorosilane of the present embodiment, as the producing apparatus 100 for trichlorosilane of the first embodiment, the folding flow-passage 443 is provided at the uppermost stream of the gas flow-passage 440 reversing from the outside to the center in the reaction vessel 410 so as to be turned one or more times at the turning length L2 along the axis C direction that is shorter than the maximum length L1 along the axis C direction of the gas flow-passage 440. Therefore, the difference of temperature between the inside and the outside of the outer wall 412 which is heated by the heaters can be suppressed, the breakage by the difference of temperature at these portions can be prevented.

Also, since the first cylindrical member 416 and the second cylindrical member 417 are formed thin, the breakage by the difference of temperature at these parts can be prevented. Furthermore, since the first cylindrical member 416 and the second cylindrical member 417 are provided between the inner wall 413 and the outer wall 412, the temperature at the upper part of the inner wall 413 is prevented from increasing, so that the breakage of the inner wall 413 by the difference of temperature between the inside and the outside can be prevented.

Figure 5:
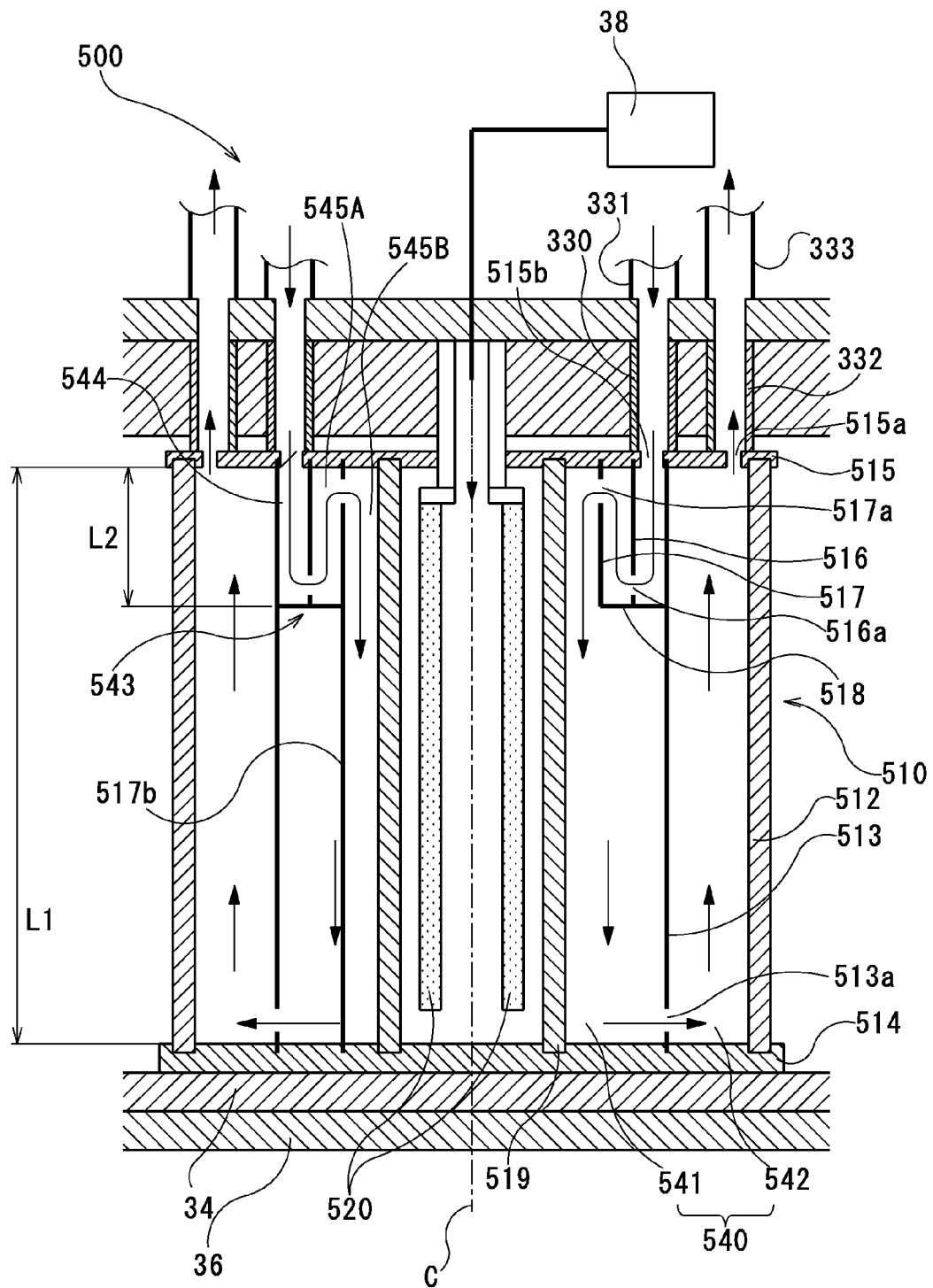
FIG. 5 is a cross sectional view showing a fourth embodiment of an apparatus for producing trichlorosilane according to the present invention.

Next, a forth embodiment of the producing apparatus 500 for trichlorosilane according to the present invention will be described with reference to FIG. 5. In the producing apparatus 500 for trichlorosilane of the present embodiment, as the producing apparatus 300 for trichlorosilane of the second embodiment, a reaction vessel 510 forming a gas flow-passage 540 surrounds heaters 520 arranged at a center of the apparatus. In the producing apparatus 500 for trichlorosilane, the same parts of the producing apparatus 300 for trichlorosilane of the second embodiment are denoted by the same reference symbols and the explanations thereof are omitted.

In the producing apparatus 500 for trichlorosilane, the reaction vessel 510 has: an outer wall 512 and an inner wall 513 each having substantially cylindrical shapes and forming the gas flow-passage 540 extending along the axis C direction; a heater-storing wall (a heated wall) 519 having a substantially cylindrical shape and forming a storing space for the heaters 520; a bottom plate 514 closing the lower openings of the outer wall 512, the inner wall 513 and the heater-storing wall 519; and a top plate 515 closing the upper openings of the outer wall 512, the inner wall 513 and the heater-storing wall 519, as the producing apparatus 300 for trichlorosilane of the second embodiment.

That is to say, in the reaction vessel 510, between the bottom plate 514 and the top plate 515, a cylindrical first flow-passage 541 is formed between the inner wall 513 and the heater-storing wall 519 and a cylindrical second flow-passage 542 is formed between the outer wall 512 and the inner wall 513, so that the gas flow-passage 540 is formed by connecting the first flow-passage 541 and the second flow-passage 542 through the passage holes 513a.

The first flow-passage 541 provided at the upper stream of the gas flow-passage 540 is connected to a gas-supply pipe 330 through a gas-supply hole 515b formed between the inner wall 513 and the heater-storing wall 519 at the top plate 515. The gas-supply pipe 330 has a double-pipe structure of the axis C as a center, and has a cylindrical space connecting with the gas-supply hole 515b. Moreover, the gas-supply pipe 330 is connected with a plurality of pipes 331 which are arranged along a circle around the axis C with substantially equal intervals.

The second flow-passage 542 provided at the downstream of the gas flow-passage 540 is connected with a gas-discharge pipe 332 through a gas-discharge hole 515a fixated at the top plate 515 between the inner wall 513 and the outer wall 512. The gas-discharge pipe 332 has a double-pipe structure of the axis C as a center, and has a cylindrical space connecting with the gas-discharge hole 515a. Moreover, the gas-discharge pipe 332 is connected with a plurality of pipes 333 which are arrange along a circle around the axis C with substantially equal intervals.

At an uppermost stream of the gas flow-passage 540, that is to say, at the upper part between the heater-storing wall 519 and the inner wall 513, a folding flow-passage 543 is provided so as to have: an inlet flow-passage 544 in which the raw gas is introduced and flows along the axis C direction; and a turning part (i.e., a first turning part 545A and a second turning part 545B) connected with the downstream of the inlet flow-passage 544 so as to turn a flow direction of the raw gas at least once in an opposite direction. In the folding flow-passage 543, the turning part (the first turning part 545A and the second turning part 545B) are formed between the inlet flow-passage 544 and the first flow-passage 541.

Specifically, the folding flow-passage 543 is formed form: the inner wall 513; a first cylindrical member 516 arranged concentrically with the inner wall 513; a second cylindrical member 517 provided concentrically with and further inner circumference of the first cylindrical member 516; an annular bottom plate 518 closing the lower openings of the first cylindrical member 516 and the second cylindrical member 517; and the heater-storing wall 519.

Figure 3:
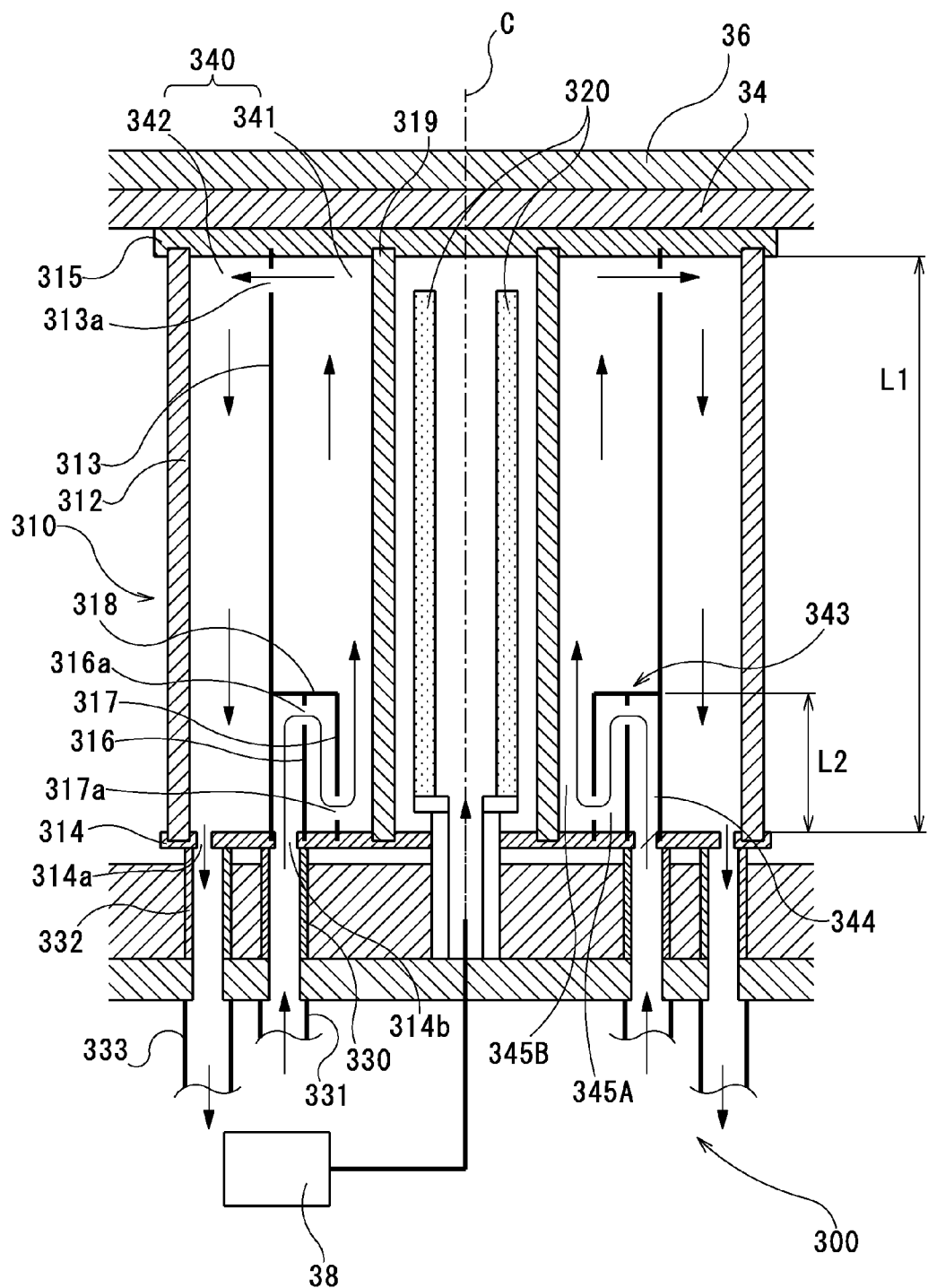
FIG. 3 is a cross sectional view showing a second embodiment of an apparatus for producing trichlorosilane according to the present invention.

The structure of the folding flow-passage 543 is substantially the same as the structure upside-down the structure in the second embodiment shown in FIG. 3. Furthermore in this embodiment, a plurality of supports 517b supporting the second cylindrical member 517 and the annular bottom plate 518 are arranged circumferentially with substantially equal intervals under the second cylindrical member 517.

The inlet flow-passage 544 formed between the inner wall 513 and the first cylindrical member 516 is connected to the first turning part 545A formed between the first cylindrical member 516 and the second cylindrical member 517 through a plurality of passage holes 516a penetrating radially the lower part of the first cylindrical member 516.

The first turning part 545A is connected to the second turning part 545B formed between the second cylindrical member 517 and the heater-storing wall 519 through a plurality of passage holes 517a penetrating radially the upper part of the second cylindrical member 517.

That is to say, the folding flow-passage 543 is formed at an uppermost stream of the gas flow-passage 540 by linking the inlet flow-passage 544, the first turning part 545A and the second turning part 545B with each other through the passage holes 516a and 517a.

As explained above, according to the producing apparatus 500 for trichlorosilane of the present embodiment, as the producing apparatus 300 for trichlorosilane of the second embodiment, the folding flow-passage 543 is provided at the uppermost stream of the gas flow-passage 540 reversing from the inside to the outside in the reaction vessel 510 so as to be turned two or more times at the turning length L2 along the axis C direction that is shorter than the maximum length L1 along the axis C direction of the gas flow-passage 540. Therefore, the difference of temperature between the inside and the outside of the heater-storing wall 519 which is heated by the heaters can be suppressed, the breakage by the difference of temperature at these portions can be prevented.

Also, since the first cylindrical member 516 and the second cylindrical member 517 are formed thin, the breakage by the difference of temperature at these parts can be prevented. Furthermore, since the first cylindrical member 516 and the second cylindrical member 517 are provided between the heater-storing wall 519 and the inner wall 513, the temperature at the upper part of the inner wall 513 is prevented from increasing, so that the breakage of the inner wall 513 by the difference of temperature between the inside and the outside can be prevented.

While preferred embodiments of the invention have been described and illustrated above, it should be understood that these are exemplary of the invention and are not to be considered as limiting. Additions, omissions, substitutions, and other modifications can be made without departing from the scope of the present invention.

What is claimed is:

1. An apparatus for producing trichlorosilane in which reacted gas including trichlorosilane and hydrogen chloride is produced by heating raw gas including silicon tetrachloride and hydrogen, the apparatus comprising:
   a reaction vessel having a substantially cylindrical shape and being provided with a heated wall forming a gas flow-passage along an axis direction; and
   a heater heating the heated wall, wherein
a folding flow-passage is provided at an uppermost stream of the gas flow passage,
   the folding flow-passage has:
      an inlet flow-passage in which raw gas is introduced from outside of the reaction vessel and flows the raw gas along the axis direction; and a turning part connected to a downstream of the inlet flow-passage in which a flow direction of the raw gas is turned at least once in an opposite direction, the turning part is formed between the inlet flow-passage and the heated wall in the folding flow-passage, and a turning length of the folding flow-passage along the axis direction is not more than 50% of a maximum length of the gas flow-passage along the axis direction.

2. The apparatus for producing trichlorosilane according to claim 1, wherein the turning length of the folding flow-passage along the axis direction is not less than 10% of the maximum length of the gas flow-passage along the axis direction.

3. The apparatus for producing trichlorosilane according to claim 1, wherein the heater is arranged at an outer periphery of the reaction vessel.

4. The apparatus for producing trichlorosilane according to claim 1, further comprising: a plurality of heaters arranged at an outer periphery of the reaction vessel.

5. The apparatus for producing trichlorosilane according to claim 1, wherein the reaction vessel includes members having a material including carbon and wherein the reaction vessel includes surfaces having silicon carbide thereon.

6. The apparatus for producing trichlorosilane according to claim 1, wherein the heater includes a heating element including carbon.

7. An apparatus for producing trichlorosilane in which reacted gas including trichlorosilane and hydrogen chloride is produced by heating raw gas including silicon tetrachloride and hydrogen, the apparatus comprising:

a reaction vessel having a substantially cylindrical shape and being provided with a heated wall forming a gas flow-passage along an axis direction; and a heater heating the heated wall, wherein the heater is arranged at a radial center of the apparatus and the reaction vessel covers the heater;

wherein a folding flow-passage is provided at an uppermost stream of the gas flow passage, the folding flow-passage has:

an inlet flow-passage in which raw gas is introduced from outside of the reaction vessel and flows the raw gas along the axis direction; and a turning part connected to a downstream of the inlet flow-passage in which a flow direction of the raw gas is turned at least once in an opposite direction, the turning part is formed between the inlet flow-passage and the heated wall in the folding flow-passage, and a turning length of the folding flow-passage along the axis direction is not more than 50% of a maximum length of the gas flow-passage along the axis direction.

8. The apparatus for producing trichlorosilane according to claim 7, wherein the turning length of the folding flow-passage along the axis direction is not less than 10%-of the maximum length of the gas flow-passage along the axis direction.

9. The apparatus for producing trichlorosilane according to claim 7, wherein the reaction vessel includes members having a material including carbon and wherein the reaction vessel includes surfaces having silicon carbide thereon.

10. The apparatus for producing trichlorosilane according to claim 7, wherein the heater includes a heating element including carbon.

* * * * *